(12) United States Patent
Williams

(10) Patent No.: US 8,051,252 B2
(45) Date of Patent: Nov. 1, 2011

(54) METHOD AND APPARATUS FOR DETECTING THE PRESENCE OF SUBBLOCKS IN A REDUCED-REDUNDANCY STORAGE SYSTEM

(76) Inventor: Ross Neil Williams, Adelaide (AU)

( * ) Notice: Subject to any disclaimer, the term of this patent is extended or adjusted under 35 U.S.C. 154(b) by 29 days.

(21) Appl. No.: 11/373,569

(22) Filed: Mar. 10, 2006

(65) Prior Publication Data

US 2007/0192548 A1    Aug. 16, 2007

Related U.S. Application Data

(60) Provisional application No. 60/660,641, filed on Mar. 11, 2005.

(51) Int. Cl.
  *G06F 13/00* (2006.01)
  *G06F 13/28* (2006.01)
  *G06F 7/00* (2006.01)
  *G06F 17/30* (2006.01)

(52) U.S. Cl. ........................ 711/154; 707/747

(58) Field of Classification Search .................... 707/747
See application file for complete search history.

(56) References Cited

U.S. PATENT DOCUMENTS

| | | | |
|---|---|---|---|
| 5,463,389 A | 10/1995 | Klaymen | |
| 5,689,567 A | 11/1997 | Miyauchi | |
| 5,742,811 A | 4/1998 | Agrawal et al. | |
| 5,829,018 A * | 10/1998 | Moertl et al. | 711/113 |
| 5,842,196 A | 11/1998 | Agarwal et al. | |
| 5,860,153 A * | 1/1999 | Matena et al. | 711/216 |
| 5,940,841 A | 8/1999 | Schmuck et al. | |
| 5,990,810 A | 11/1999 | Williams | |
| 6,292,795 B1 | 9/2001 | Peters et al. | |
| 6,374,266 B1 * | 4/2002 | Shnelvar | 707/204 |
| 6,407,679 B1 * | 6/2002 | Evans et al. | 341/20 |
| 6,438,562 B1 | 8/2002 | Gupta et al. | |
| 6,505,206 B1 | 1/2003 | Tikkenen et al. | |
| 6,594,665 B1 | 7/2003 | Sowa et al. | |
| 6,704,730 B2 | 3/2004 | Moulton et al. | |
| 6,754,799 B2 | 6/2004 | Frank | |
| 6,757,686 B1 | 7/2004 | Syeda-Mahmood et al. | |
| 6,959,384 B1 | 10/2005 | Serret-Avila | |
| 2003/0009482 A1 | 1/2003 | Benerjee | |
| 2003/0018878 A1 | 1/2003 | Dorward et al. | |
| 2003/0093645 A1 * | 5/2003 | Wong et al. | 711/216 |
| 2004/0064737 A1 | 4/2004 | Milliken | |

(Continued)

OTHER PUBLICATIONS

Nelson, Mark, "Arithmetic Coding + Statistical Modeling = Data Compression", Feb. 1991.*

(Continued)

*Primary Examiner* — Edward J Dudek, Jr.

(57) ABSTRACT

Method and apparatus for rapidly determining whether a particular subblock of data is present in a reduced-redundancy storage system. An aspect of the invention achieves this by hashing each subblock in the storage system into a bitfilter that contains a '1' bit for each position to which at least one subblock hashes. This bitfilter provides an extremely fast way to determine whether a subblock is in the storage system. In a further aspect of the invention, index entries for new subblocks may be buffered in a subblock index write buffer so as to convert a large number of random access read and write operations into a single sequential read and a single sequential write operation. The combination of the bitfilter and the write buffer yields a reduced-redundancy storage system that uses significantly less high speed random access memory than is used by systems that store the entire subblock index in memory.

18 Claims, 12 Drawing Sheets

U.S. PATENT DOCUMENTS

2006/0271540 A1     11/2006    Williams
2006/0282457 A1     12/2006    Williams

OTHER PUBLICATIONS

Madden, Sam, "Good things come in small packages: The advantage of compression in column databases", Sep. 2007.*

Langdon, G.G., Rissanen, J.J., "Compression of Black-White Images with Arithmetic Coding." IEEE Transactions on Communications (1981), 29(6), pp. 858-867.

Madden, Sam, "Good Things Come in Small Packages: The Advantage of Compression in column Databases." The Database Column (Sep. 11, 2007), pp. 1-5.

Nelson, Mark, "Arithmetic Coding + Statistical Modeling=Data Compression." Dr. Dobb's Journal (Feb. 1991), pp. 1-12.

Tanaka, Hatsukazu, Leon-Garcia, Alberto, "Efficient Run-Length Encodings." IEEE Transactions on Information Theory (Nov. 1982), 28(6), pp. 880-890.

Ramabhadran, Sriram, et al., "Prefix Hash Tree an Indexing Data Structure over Distributed Hash Tables," Jan. 2004. http://www.icsi.berkeley.edu/cgi-bin/pubs/publication.pl?ID=000071.

Dynamic Hash Tables, Per-Ake Larson, Apr. 1988, vol. 31 No. 4.

Hash Table Methods, W.D. Maurer and T.G. Lewis, Computing Surveys, vol. 7 No. 1, Mar. 1975.

Williams, Dan and Sirer, Emin, "Optimal Parameter Selection for Efficient Memory Integrity Verification Using Merkle Hash Trees", NCA (2004).

Litwin, Witold, "Linear Hashing: A New Tool for File and Table Addresses." IEEE, (1980).

Nilsson, Stefan and Tikkanen, Matti, "Implementing a Dynamic Compressed Trie." (1998).

European Search Report from co-pending European Application No. 06705001.3 having date of Sep. 17, 2010—7 pgs.

Garcia-Molina, et al.: "Database Systems: The Complete Book", 2002, XP002599408, ISBN 0130980439—14 pgs.

* cited by examiner

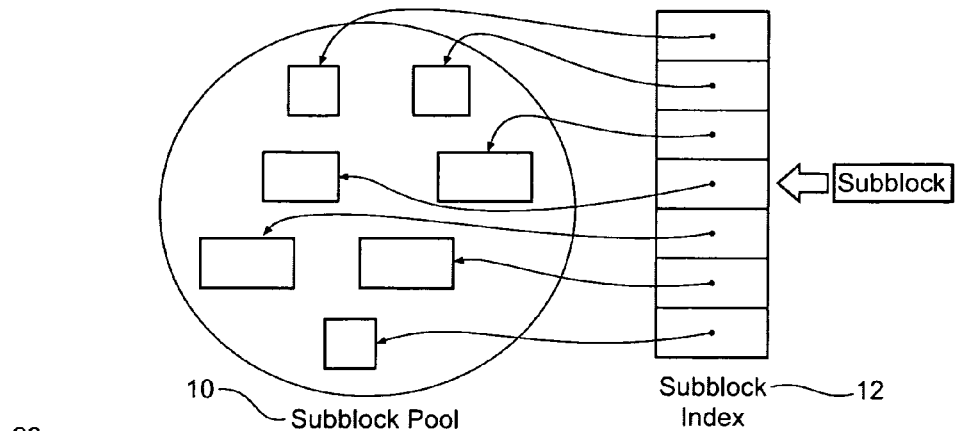
Figure 1 Prior Art
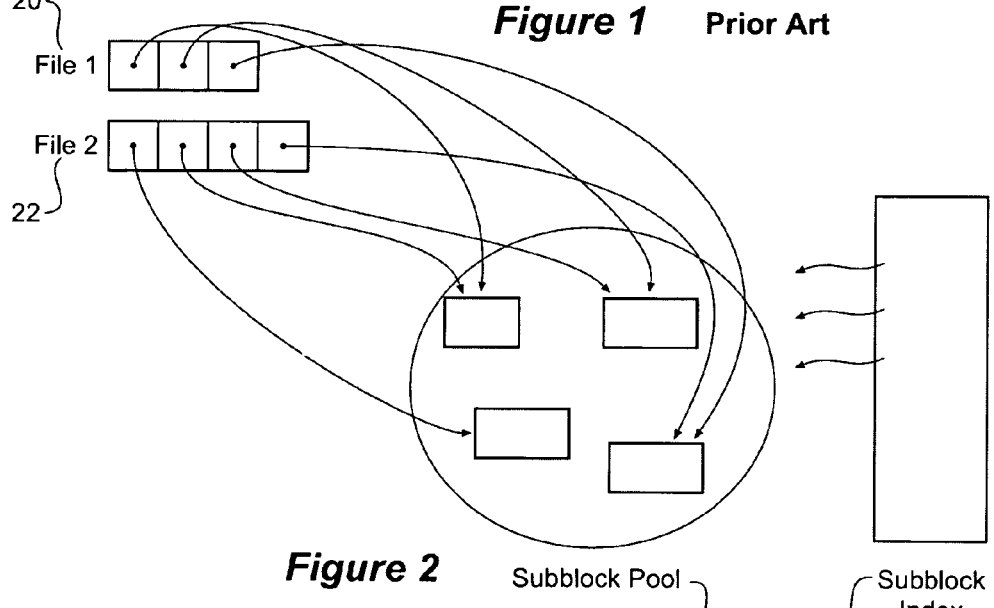
Figure 2
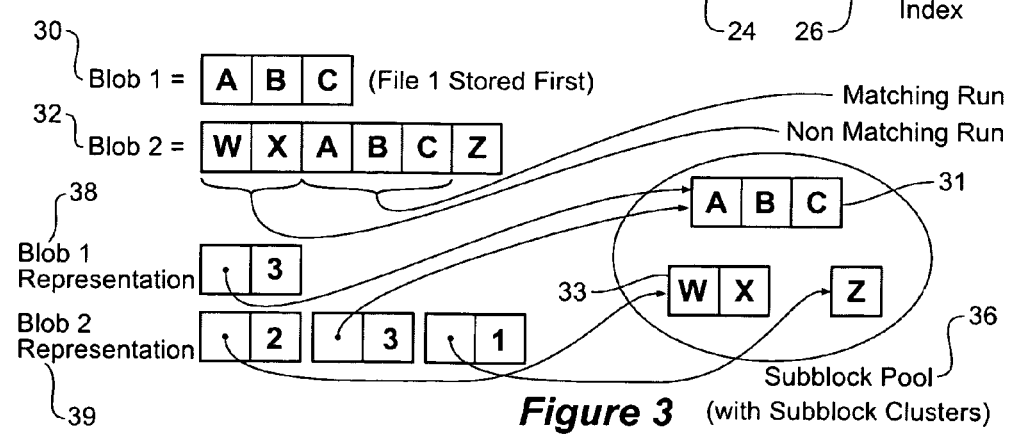
Figure 3 (with Subblock Clusters)

METHOD AND APPARATUS FOR DETECTING THE PRESENCE OF SUBBLOCKS IN A REDUCED-REDUNDANCY STORAGE SYSTEM

CROSS-REFERENCE

This application claims the benefit of U.S. Provisional Application No. 60/660,641, filed Mar. 11, 2005, which is incorporated herein by reference in its entirety.

This application is related to the following copending patent applications: U.S. application Ser. No. 11/373,420 for Method and Apparatus for Storing Data with Reduced Redundancy Using Data Clusters, invented by Ross Neil Williams, filed Mar. 10, 2006; and application Ser. No. 11/372,603 for Method and Apparatus for Indexing in a Reduced-Redundancy System, invented by Ross Neil Williams, filed Mar. 10, 2006, which are incorporated herein by reference in their entirety.

FIELD

The field of the invention relates to a method and apparatus for rapidly determining whether a particular piece of data is present in a reduced-redundancy computer data storage system.

BACKGROUND OF THE INVENTION

Conventional data storage systems, such as conventional file systems, organise and index pieces of data by name. These conventional systems make no attempt to identify and eliminate repeated pieces of data within the collection of files they store. Depending on the pattern of storage, a conventional file system might contain a thousand copies of the same megabyte of data in a thousand different files.

A reduced-redundancy storage system reduces the occurrence of duplicate copies of the same data by partitioning the data it stores into subblocks and then detecting and eliminating duplicate subblocks. A method for partitioning data into subblocks for the purpose of communication and storage is described in U.S. Pat. No. 5,990,810 by Ross Williams (also the inventor of the invention described here), and is incorporated by reference into this specification.

In a reduced-redundancy computer storage system, each BLOB (Binary Large Object—a finite sequence of zero or more bytes (or bits)) is represented as a sequence of subblocks from a pool of subblocks.

FIG. 1 (prior art) shows a pool of subblocks 10 indexed by a subblock index. By maintaining an index of subblocks 12, a storage system can determine whether a new subblock is already present in the storage system and, if it is, determine its location. The storage system can then create a reference to the existing subblock rather than storing the same subblock again. FIG. 2 shows how the representations of two different BLOBs 20, 22 can both refer to the same subblocks in the pool 24, thereby saving space. This sharing enables the storage system to store the data in less space than is taken up by the original data.

The subblock index 26 should contain an entry for each subblock. Each entry provides information to identify the subblock (distinguish it from all others) and information about the location of the subblock within the subblock pool. These entries can consume a significant amount of space. For example, if 128-bit (16 byte) hashes (of subblocks) were used as subblock identifiers, and 128-bit (16 byte) subblock storage addresses were used as addresses, then the size of each entry would be 32 bytes. If the mean subblock length were 1024 bytes, then this would mean that the index would be about 3% of the size of the data actually stored. This would mean that a storage system containing one terabyte would require a subblock index of about 30 Gigabytes (3% of 1TB).

The requirement to maintain an index, whose size is of the order of 3% of the size of the store, would not matter much if the index could be stored on disk. However, in reduced-redundancy storage systems, the index can be referred to very frequently, as each new BLOB to be stored must be divided into subblocks, and many of the subblocks (or their hashes) looked up in the index. If the mean subblock length is 1024 bytes, then storage of a twenty megabyte block of data may require dividing the data into about 20,480 subblocks and then performing an index lookup on each subblock. If the index is on disk, then this may involve at least 20,000 random access seek operations, which is far slower than the same number of memory accesses. If the index is held in memory instead of disk, then the system will run much faster. However, memory (RAM) is far more expensive than disk space, and the requirement that the RAM/disk ratio be of the order of 3% can be onerous for large stores.

Aspects of the present invention provide an indexing method that consumes far less memory than the system just described that holds the entire index in memory.

SUMMARY OF THE INVENTION

The first observation is that it is very much more important to lookup the index quickly when a subblock is not present in the store than when it is present. This is because, for actual data, most index lookups are for absent subblocks (subblocks not in the store). This in turn is because present ("matching") subblocks (i.e. subblocks in the store) often occur in runs 40. FIG. 4 shows how a BLOB that is being stored can be modelled as an alternating sequence of matching ("present") and non-matching ("absent") runs of subblocks 42.

FIG. 3 shows how two different BLOBs 30, 32 can share a run of subblocks. The first BLOB 38 stored consisted of subblocks ABC. This caused a cluster 31 of subblocks containing subblocks A, B and C to be created in the pool 36. The second BLOB 39 is then stored. Its first two subblocks W and X are absent from the store so they are placed in a cluster (in this example, a new cluster 33). However, the next three subblocks are a run of subblocks ABC that are already in the store in the same order. This causes the representation of the second BLOB to refer to the entire run of matching subblocks A, B and C. While subblocks W and X must be looked up in the index, once the fact that subblock A has been detected as already being in the store, and once it has been found in a cluster, matching B and C can easily be performed without referring to the index.

Once a subblock to be stored has been discovered to be already present in the store, it is likely that the next several (maybe even several hundred) subblocks will also be present and will be found immediately following the matching subblock. As such, the rest of the run of matching subblocks can be stored without looking up the index. Each incoming subblock can be compared with the next subblock in the matching run of subblocks without reference to the index. The index is only required again when the matching run ends.

In contrast, during a run of absent subblocks (i.e. subblocks that are not in the store) an index lookup must be performed for every single subblock (unless some duplication of subblocks in the store is to be tolerated).

This analysis suggests that, regardless of the level of redundancy of the data, most index lookup operations will be of subblocks that are not present in the store. So the present invention focuses on optimising these lookups.

A second observation is that lookups that fail require no further information from the index. If a subblock is present, the index yields a storage location for the subblock. However, if a subblock is absent, no further information is required; the subblock can simply be written to a cluster in the store and indexed. It follows that, for the vast majority of index lookups, the only requirement of the index is that it confirm that a subblock is absent.

The third observation is that there is no need to make the index lookup of every absent subblock fast (particularly with respect to memory vs disk accesses). So long as most of the lookups can be made fast, then the speed of the index will be vastly improved.

All these observation are taken into account in the present invention which eliminates the need to hold the whole index in memory.

In an aspect of the invention, the index resides on disk and a bitfilter 130 is maintained in memory. The bitfilter is an array of bits, which commences as all '0's. When each subblock 132 is stored, its content is hashed 134 to yield a position in the bitfilter and the bit there is set to '1'. If the bit is already '1', it remains as '1'. Positions within the bitfilter, to which no subblock maps, remain '0'. FIG. 13 shows how four subblocks might be hashed to four locations in the bitfilter. Opposite digital values could be used, with '1' being used for convenience as a predetermined bit value.

As most embodiments are likely to hash subblocks (using a cryptographic hash) anyway (e.g. for comparison purposes), it is simple to use the subblock's hash as a basis for a secondary hash into the bitfilter. FIG. 5 depicts this two-step process. For example, if the bitfilter had 1024 bits, a subblock 50 could be hashed 52 using an MD5 hash algorithm to a 128-bit hash and the first ten bits of the hash used to form an index into the bitfilter 54 from 0 to 1023. FIG. 14 depicts a more general embodiment where the first hash 140 is either non-cryptographic or cryptographic, and where the bitfilter hash function 142 may consist of a modulo operation on part or all of the result of the first hash.

The result of setting bits in the bitfilter this way is that the bitfilter will contain a record of the subblocks stored. This record will be lossy (unless the bitfilter contains at least one bit for each possible hash). For any practical bitfilter size, this means that some of the incoming subblocks map to the same bit. This means that if two subblocks 60, 62, one present and one absent, map to the same bit 164, and that bit is turned on 166, then a lookup of the absent subblock will incorrectly indicate that the subblock is present. FIG. 6 depicts such a collision. These bitfilter collisions do not threaten correctness because, if a subblock is hashed to a position and a '1' found there, the index is then looked up to see if the subblock really is there.

The likelihood of a new subblock colliding with an existing subblock in the bitfilter is the same as the density of the bitfilter (number of '1' bits divided by the total number of bits), which, for a sparse bitfilter, is about the same as the ratio of stored subblocks to the number of bits in the bitfilter. The density will be denoted 1/D. As the size of the bitfilter is a design choice, so is the density, and so it is possible to lower the chance of subblock "collisions" to any desired level. Collisions can still occur though, as, in any practical embodiment, the number of bits in the bitfilter will be less than the number of possible subblock hash values.

The bitfilter does, however, retain one important certainty. If a subblock is hashed to a bit in the bitfilter, and the bit is '0', then it is certain that the subblock is absent from the store. This is a critical property because the data structure provides certainty in the most common case—that of an absent subblock.

In summary, the index resides on disk, but the bitfilter resides in memory. Data to be stored is divided into subblocks using a partitioning method and the first subblock is looked up in the bitfilter. If the bit is '0', then the subblock is certainly absent from the store and can be written to the store and indexed (and its bitfilter bit set to '1'). If the bit is '1', then the subblock may or may not be present in the store; the index on disk can then be consulted to be sure. If the subblock is present, there is a matching run of one or more subblocks. As each matching run requires just one index lookup (for the first subblock in the run), and as each absent subblock requires an index lookup with probability 1/D (the bitfilter density), then so long as the density is kept low, the index will be required relatively rarely.

A remaining issue is the updating of the index, for even if a subblock's bit is '0', the subblock still has to be added to the index. The obvious approach of performing a random access read and write to the index on disk for each subblock is clearly inefficient.

In a further aspect of the invention, the bitfilter is combined with a memory-resident 120 index entry write buffer. When a subblock is added to the index, it is instead added to the buffer 122. This is much faster than performing a random access write to the index on disk 124. FIG. 12 depicts the relationship between the bitfilter 126, the index entry write buffer 122, and the subblock index 128.

When the buffer becomes sufficiently full, it is flushed 121 to the disk 124 index 128 by sorting the entries in the buffer (or having kept them sorted) and then performing a single sequential pass through the index in which the next section of the index is read into memory, the entries in the buffer that fall in that section are merged in, and then the section is written back out to the index on disk. In this way, hundreds of random access read/write IO operation pairs are converted to a single sequential read operation and a single sequential write operation (which are faster than random access operations) without having to hold the entire index in memory.

As the contents of the unflushed buffer effectively form part of the index, it should be searched whenever the index is searched. However, this will not slow the system down, as the buffer is in memory.

One issue with this buffering approach is that, when the buffer is full, everything stops while it is flushed. This is a disadvantage in real-time systems. In a further aspect of the invention, the index 70 and the buffer 72 are split into sections and each section is buffered separately (FIG. 7). This eliminates the need to flush the entire buffer all at once. In a further aspect of the invention, the bitfilter is similarly divided into corresponding sections.

In a further aspect of the invention, the bitfilter is compressed using a bitfilter compression method. This can provide a huge reduction in memory consumption, particularly if the bitfilter density is low.

In a further aspect of the invention, the subblock index is looked up only if the bitfilter yields a '1' for at least T consecutive subblocks of the data being stored, where T is a positive integer threshold. Setting T=1 is the normal case. Setting T to higher values causes all matching runs of subblocks less than T subblocks long to be duplicated in the store as if they were absent subblocks, but speeds up subblock storage and reduces fragmentation. If 1/D is the density of the bitfilter, then setting T=2 will reduce the probability of a "false positive" (in which a subblock hashes to a '1' bit in the bitfilter but is then found to be absent from the store) from 1/D to $1/D^2$.

In a further aspect of the invention, with T set to a value above one, only every T'th subblock is indexed, but every subblock (not in a matching run) is looked up in the bitfilter (and, if there is a '1' bit there, the index is also accessed). If the subblock is present in the store, the T−1 subblocks in the store that precede the matching subblock are compared to the subblocks preceding the matching subblock and if there is a match, these are combined in as part of the matching run. FIG. 18 depicts an example for T=3 where a BLOB BLOB1 180 has been stored with only every third subblock being indexed. When BLOB2 182 is stored, each of its subblocks is looked up in the bitfilter. If the result for a subblock is 1 184, the subblock is looked up in the index and, if the subblock is determined to be present in a cluster 186, a search 188 for adjacent matching subblocks proceeds both backwards and forwards from the matching subblock. In this example, subblocks B and C in BLOB2 appeared in BLOB1 and are already in the store, but the match is not detected when they are processed (for BLOB2) because subblocks B and C were not indexed (and added to the bitfilter) when BLOB1 was stored. However, when subblock D is looked up in the bitfilter, the result is a 1 (because it was indexed when BLOB1 was stored) and so subblock D is looked up in the index and found in the cluster in the subblock pool. With this match of subblock D established, a search is performed backwards (up to T−1 (in this case 2) subblocks) and it is discovered that subblocks B and C match. A search forward from subblock D also reveals that subblock E matches, but subblock Y does not. The final result is that a match of the run of subblocks BCDE is made.

TERMINOLOGY

Absent Subblock: A subblock that is not present in the store.

Bitfilter: An array of bits used to record the presence or absence of subblocks.

Bitfilter Collision: A bitfilter collision occurs when more than one subblock that is stored in a store hashes to the same bitfilter position.

Bitfilter Density: A value in the range [0,1] being the number of '1' bits in the bitfilter divided by the total number of bits in the bitfilter.

BLOB (Binary Large OBject): This is a finite sequence of zero or more bytes (or bits) of data. Despite its name, a BLOB is not necessarily large; a BLOB could be as small as a few bits or as large as gigabytes.

BLOB Fragmentation: The extent to which storage of a BLOB is scattered throughout the storage system.

Buffer: See Index Entry Write Buffer.

Collision: See Bitfilter Collision.

Cryptographic Hash: A hash function that has been engineered to be computationally infeasible to invert.

Density: See Bitfilter Density.

Disk: A random access storage medium used by computers. Typically, the term refers to spinning platters of metal holding magnetised data (hard disks). In the context of this document, the term may more broadly be taken to mean a random access storage medium that is significantly slower than Memory.

False Positive: A false positive occurs when an absent subblock hashes to a position in the bitfilter that holds a '1'.

Hash: A fixed-length sequence of bytes (or bits) generated by a hash algorithm. Hashes of subblocks may be used as representatives of the subblocks to index and compare subblocks.

Hash Algorithm: An algorithm that accepts a finite sequence of bytes (or bits) and generates a finite sequence of bytes (or bits) that is highly dependent on the input sequence. Typically a hash algorithm generates output of a particular fixed length. Hash algorithms can be used to test to see if two sequences of data might be identical without having to compare the sequences directly. Cryptographic hashes practically allow one to conclude that two subblocks are identical if their hashes are identical.

Hash of Subblock: See Subblock Hash.

Index: See Subblock Index.

Index Buffer: See Index Entry Write Buffer.

Index Entry: A record in the subblock index. In some embodiments an index record contains an index key and an index value. In some embodiments an index record contains part of an index key and an index value. In some embodiments an index record contains just an index value. In some embodiments an index record contains no value and some or all of a key.

Index Entry Write Buffer: A buffer in memory that holds zero or more recently added index entries that form part of the subblock index, but which have not yet been written to the index on disk.

Index Key: The information about a subblock provided to the subblock index in order to retrieve information about the subblock. In some embodiments, the information is retrieved by locating and reading an index entry.

Index Lookup: An operation that maps a subblock (or a subblock's hash) to an index entry. The index entry provides information about the location of the subblock on disk.

Index Value: The information yielded about a subblock by the index when the subblock (or a derivative of the subblock, an example of which is its hash) is looked up in the index. In some embodiments, the value consists of the location of the subblock on disk. In other embodiments there may be no value if the sole purpose of the index is to record the presence or absence of a key.

Memory: A random access storage medium used by computers, typically referring to Random Access Memory (RAM). In the context of this document, the term may more broadly be taken to mean a random access storage medium that is significantly faster than Disk.

Partitioning Method: A method for dividing a BLOB into one or more subblocks such that every byte (or bit) in the BLOB falls within exactly one subblock.

Present Subblock: A subblock that is present within the store.

Reduced-Redundancy Store: A storage system that eliminates, in its representation of data, some of the duplicated data within the set of data that it stores.

Store: See Reduced-Redundancy Store.

Subblock: A sequence of bytes (or bits) that has been identified as a unit for the purpose of indexing, comparison and/or redundancy elimination. A BLOB may be partitioned into subblocks.

Subblock Hash: The result of applying a hash algorithm to a subblock. Hashes of subblocks may be used, for example, as representatives of the subblocks to index and/or compare the subblocks.

Subblock Index: A data structure that maps (or otherwise associates) a subblock's hash (or the subblock itself) to the location of the subblock (e.g., without limitation, a cluster number (and possibly also a subblock identifier)).

Subblock Pool: A collection of subblocks in a reduced-redundancy storage system.

Write Buffer: See Index Entry Write Buffer.

Throughout this specification and the claims that follow, unless the context requires otherwise, the words 'comprise' and 'include' and variations such as 'comprising' and 'including' will be understood to imply the inclusion of a stated integer or group of integers but not the exclusion of any other integer or group of integers.

The reference to any prior art in this specification is not, and should not be taken as, an acknowledgement or any form of suggestion that such prior art forms part of the common general knowledge.

INCORPORATION BY REFERENCE

All publications and patent applications mentioned in this specification are herein incorporated by reference to the same extent as if each individual publication or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 1 depicts a subblock pool and an index that makes it possible to locate any subblock in the pool (prior art).

FIG. 2 shows how identification of identical subblocks in two different files allows the files to be stored in less space by storing the identical subblocks just once.

FIG. 3 shows how, once it is determined that the next subblock to be stored is already present in the store, the next subblocks to be stored and the subblocks in the store that follow the subblock just matched can be compared without requiring reference to the subblock index.

DETAILED DESCRIPTION OF THE INVENTION

Figure 4:
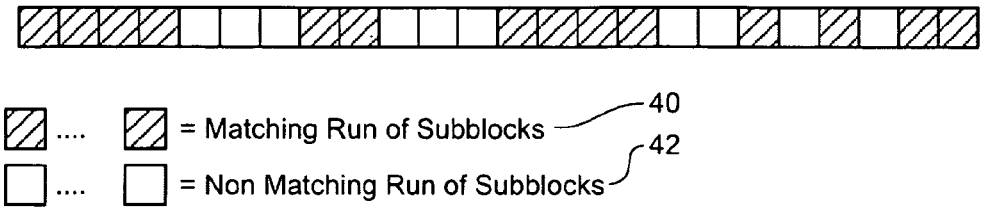
FIG. 4 shows how the subblocks in a BLOB of data may be viewed as comprising of alternating runs of matching (present) and non-matching (absent) subblocks.
Figure 5:
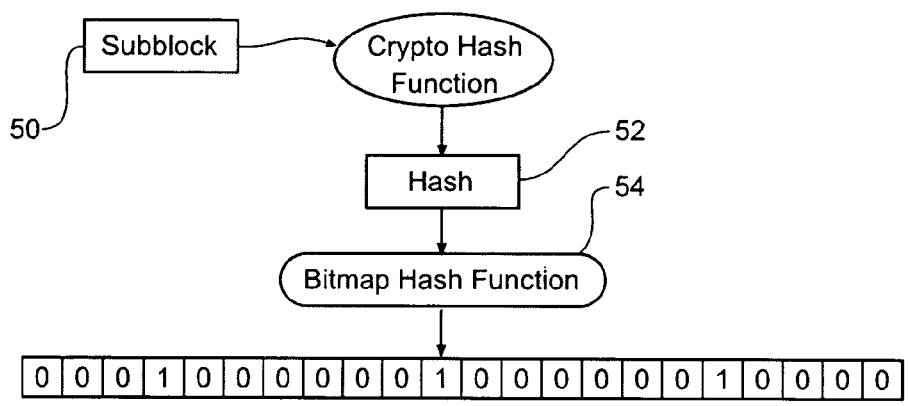
FIG. 5 shows how a subblock is mapped to a position in the bitfilter, first by taking its cryptographic hash and then feeding that into the bitfilter hash function to generate the bitfilter index.
Figure 6:
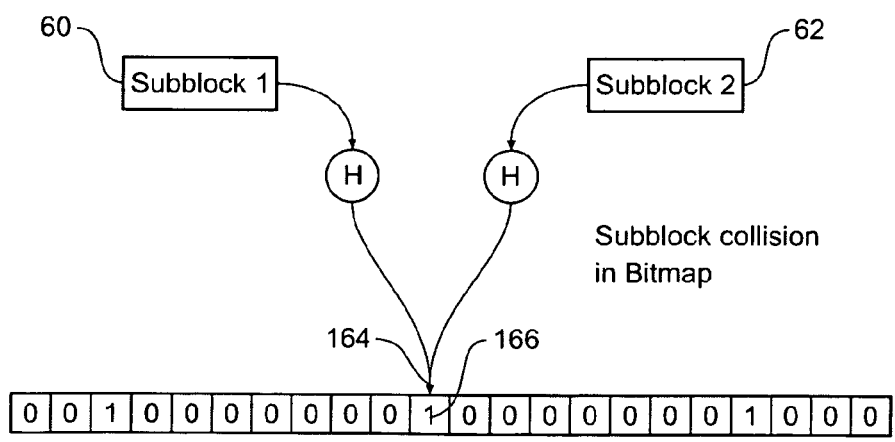
FIG. 6 depicts a bitfilter collision in which two subblocks hash to the same position in the bitfilter.
Figure 7:
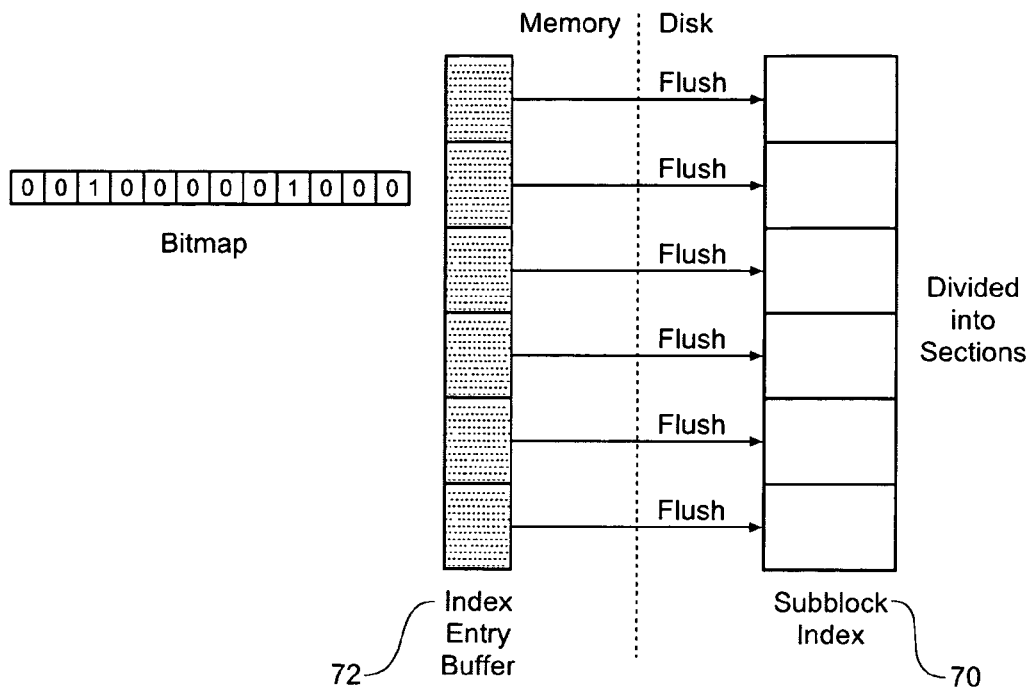
FIG. 7 shows how the subblock index can reside on disk with only the bitfilter and the index entry write buffer residing in memory.

Specific embodiments of the invention will now be described in some further detail with reference to and as illustrated in the accompanying figures. These embodiments are illustrative, and are not meant to be restrictive of the scope of the invention. Suggestions and descriptions of other embodiments may be included within the scope of the invention but they may not be illustrated in the accompanying figures or alternatively features of the invention may be shown in the figures but not described in the specification.

I. Partitioning Methods

There are a variety of ways in which data can be partitioned into subblocks. These include fixed-length partitioning (in which the data is divided into N-byte subblocks) and variable-length partitioning in which the data is divided into variable-length subblocks at positions where the bytes (or bits) near the position satisfy some predetermined constraint. A detailed discussion of variable-length partitioning methods can be found in U.S. Pat. No. 5,990,810 by Ross Williams.

II. Hashing Subblocks

At least two kinds of hashing may be employed.

First, the storage system hashes subblocks into fixed-length hashes so that the subblocks can be more easily indexed and manipulated. This hashing operation is preferably performed by a cryptographic hash algorithm so as to allow secure comparison of subblocks by comparing their hashes. Examples of cryptographic hash algorithms are MD5 (which yields a 128-bit (16 byte) value) and SHA-1 (which yields a 160-bit (20 byte) value).

Second, the subblock hashes (or perhaps just the subblocks) are hashed into a position in the bitfilter. This operation does not require cryptographic strength as collisions are expected in the bitfilter, so the hashing can be performed using one of a variety of methods. One simple method of hashing a subblock to a bitfilter position is to take K bits (for some K) of the subblock hash and to divide the value by B (the number of bits in the bitfilter) to yield a remainder (modulo function). This remainder is used as the subblock's bitfilter position. This method should load the bitfilter fairly evenly so long as $2^K$ is at least an order of magnitude higher than B.

If the number of bits in the bitfilter is a power of two, the modulo function can be performed simply by taking the bottom K bits.

III. The Important Property of The Bitfilter

The most important property of the bitfilter is that if a subblock hashes to a '1' bit, the subblock may or may not be present, but if the subblock hashes to a '0' bit, the subblock is definitely not present in the store. It is this certainty that makes the bitfilter useful.

IV. Bitfilter Density and Size

How big should the bitfilter be? For a given number of '1' bits, a larger bitfilter will consume more memory, but will have a lower density (ratio of '1' bits to bits in the bitfilter). A smaller bitfilter will consume less memory, but have a higher density. So there is a trade-off between memory consumption and bitfilter density.

Memory consumption is clearly undesirable, as reducing the memory used by reduced-redundancy storage systems was one of the reasons for introducing the bitfilter in the first place. So the bitfilter shouldn't be made too large, or its very size will subvert its purpose.

The density of the bitfilter is important too because it determines the rate of false positive events. These occur when a subblock that is not already in the store is hashed into the bitfilter and there is a '1' there (because it was set by some other subblock). When this happens, the store accesses the index on disk to see if the subblock is really present (and determines that it is absent). If the average density of the bitfilter is a '1' bit every D bits, then the false positive rate will be 1/D.

The trade off between the false positive rate and memory consumption is one that can only be made in the light of more information about the specific application, taking into account such factors as the cost of memory and the mean subblock length.

V. Bitfilter Growth

No matter what size is chosen for the bitfilter, its density will increase over time as subblocks are added to the index. If the density becomes too high, the size of the bitfilter can be increased to reduce the false positive rate.

There seems to be no obvious way to increase the size of the bitfilter using only the information in the bitfilter, as each '1' bit does not contain information about the set of one or more subblocks that caused it to be set to '1'. Instead, a fresh larger bitfilter can be constructed from the information in the index. This can be performed by preparing a new larger bitfilter in memory, setting it to all '0's, and then performing a single sequential pass through the index, hashing each entry to a bit in the bitfilter and then setting it to '1'.

Even if the pass through the index can be performed sequentially, it is still likely to be a time consuming operation. In some embodiments, the index can be several gigabytes. Re-reading the entire index, even sequentially, is unacceptable in systems with real-time deadlines.

One solution is to prepare the new bitfilter in the background. When the existing bitfilter becomes too dense, a new, larger bitfilter could be prepared in memory. A background process could read the entire index sequentially and prepare the new bitfilter. When this operation is complete, the old bitfilter can be discarded. During the process of creating the new bitfilter, all new subblocks would have to set bits in both the old and new bitfilters so that subblocks arriving after the start of the operation would still be represented in the new bitfilter. However, part of the solution may cause an additional spike in memory usage during the changeover.

Figure 8:
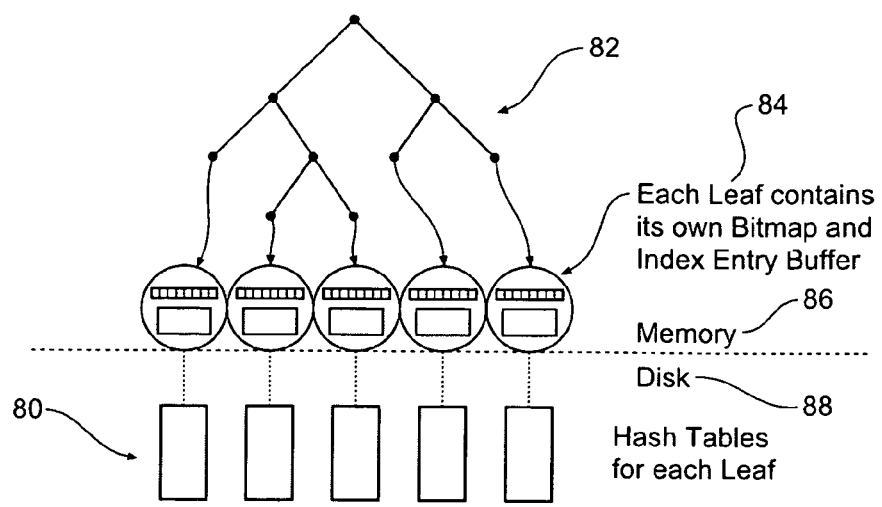
FIG. 8 depicts a binary digital search tree each leaf of which contains a hash table which is stored on disk and a bitfilter and index entry write buffer which are stored in memory.
Figure 15:
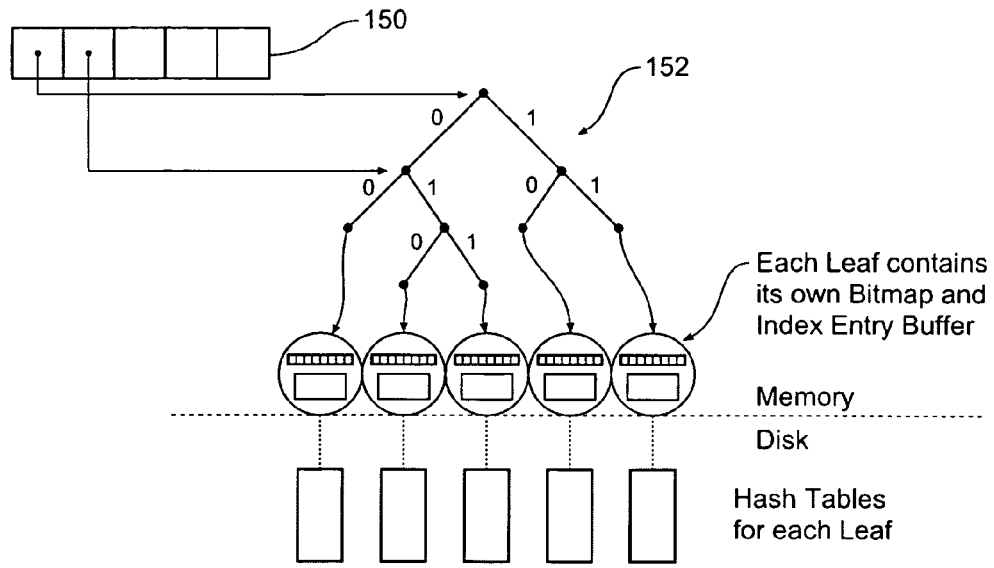
FIG. 15 shows a binary digital search tree keyed on successive bits of the subblock hash, each leaf of which contains a hash table which is stored on disk and a bitfilter and index entry write buffer which are stored in memory.

A better solution is to divide the index into sections and maintain a separate bitfilter for each section. Then, if the bitfilter for a particular section becomes too dense, it can be expanded independently of the other section's bitfilters. This strategy can work particularly well in synergy with an index that is itself organised for growth, such as an index that is a tree of hash tables 80. In this case, a bitfilter can be associated with each hash table 82 and split when the hash table is split. FIG. 8 depicts a tree in which each leaf holds its own bitfilter and index 84 entry buffer in memory 88. On disk 86, there is a hash table 80 corresponding to each leaf. FIG. 15 is similar and shows the subblock hash 150 values relative to the binary tree 152.

VI. Index Entry Write Buffer

There are a variety of ways to implement the index entry write buffer. It is should be possible to add index entries to the buffer and in some embodiments there may be a requirement to search the buffer.

If the buffer corresponds to just a section of the index, it may not be very large. If this is the case, a simple unordered list could do the job, with a linear search being used to search the index when required. As the buffer is in memory, a linear search could be reasonably fast.

If the buffer is larger, its entries may have to be maintained in sorted order, or some kind of tree or hash table data structure so as to enable them to be searched quickly.

If the storage system supports the deletion of BLOBs, then it may be necessary for the index entry write buffer to buffer deletions as well as insertions.

VII. False Positives

One issue with using the bitfilter is "false positives" where a subblock hashes to a '1' bit in the bitfilter but where, upon accessing the index, the subblock is found to be absent from the store. If the density of the bitfilter is 1/D, then these false positives should arise on average once every D absent subblocks. False positives can cause a random access read to the index on disk.

Experiments have shown that the combination of the bitfilter and the index entry write buffer is so effective at reducing random access disk operations that in systems that are storing significant quantities of fresh data, false positives start to become one of the limiting factors in system performance. Even with D=100, the random access seek that occurs on average once per 100 subblocks features prominently in performance analyses.

Figure 11:
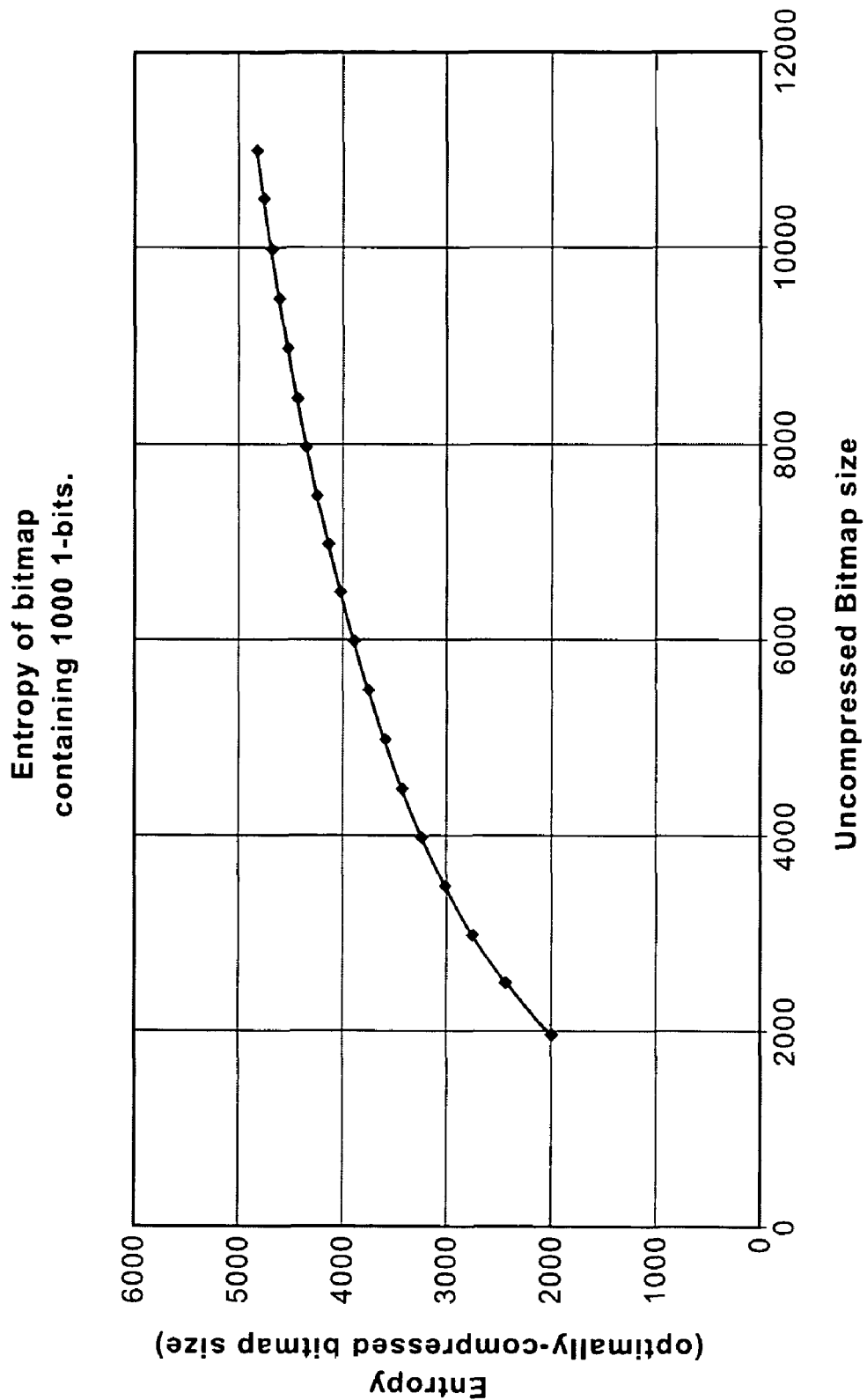
FIG. 11 shows the non-linear relationship between the density of a bitfilter and its compressibility. The graph shows the compressibility of a bitfilter containing 1000 '1' bits. The X axis is the total uncompressed size of the bitfilter and the Y axis is the optimally-compressed size of the bitfilter.

The simplest way to reduce this time penalty is to reduce the density of the bitfilter. For example, if D is raised from 100 to 200, the cost halves. This is a valid option, and can be particularly effective as, though the size of the bitfilter doubles, the compressed size of the bitfilter increases in size by less than double (because lower entropy bitfilters are more compressible) (FIG. 11).

Another approach is to increase the mean subblock length. Increasing the mean subblock length (within the range 1K to 16K) usually improves a variety of performance metrics except the extent of data reduction. For example, if the mean subblock length is doubled, the bitfilter density halves.

VIII. Skipping Short Matching Runs

Figure 9:
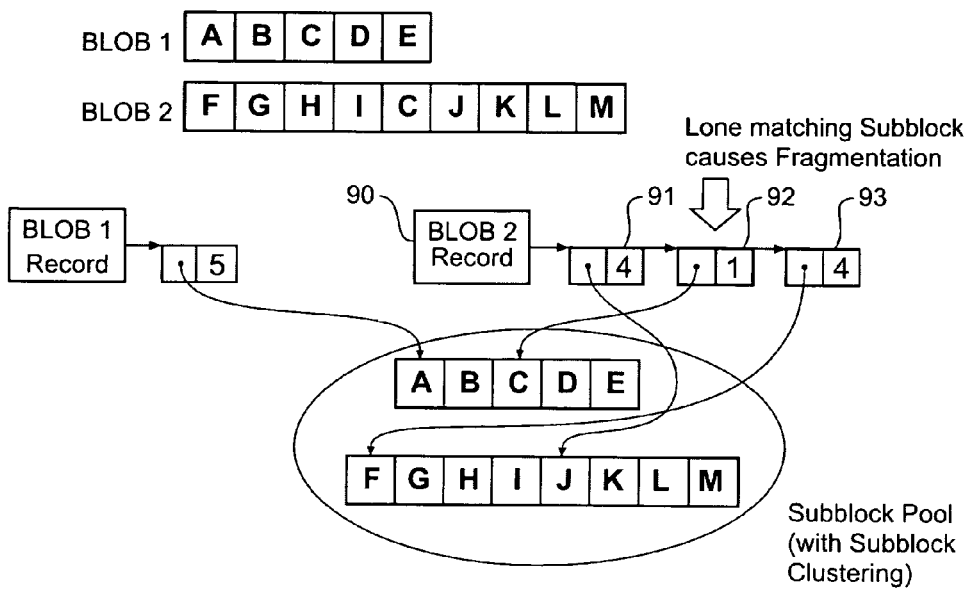
FIG. 9 shows how, when a BLOB is stored, an isolated matching subblock (C) can cause fragmentation in the representation of the BLOB.

A more interesting approach to reducing false positives is to address them in the context of BLOB fragmentation. If a BLOB is being stored and its subblocks are not found in the store, the subblocks will typically be written sequentially to the store. However, the moment a subblock matches, the system must process a run of one or more matching subblocks. If that run is very short, the representation of the BLOB becomes fragmented for very little reduction in space. In FIG. 9 the representation of BLOB2 90 is split into three parts 91, 92, 93 just because a single subblock C is already present in the store.

Figure 10:
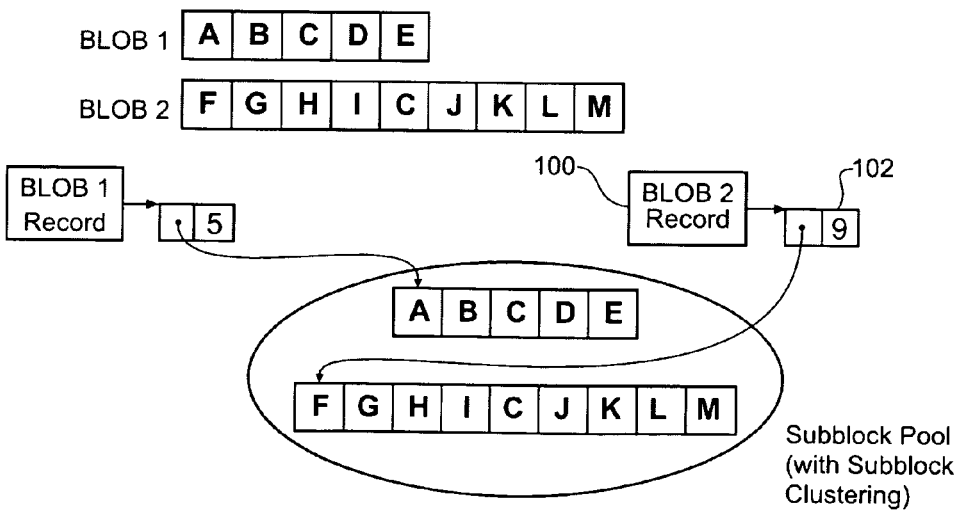
FIG. 10 shows how fragmentation can be avoided by choosing to store an isolated subblock (C) in the store twice.

To avoid small matching runs that increase fragmentation but do not improve storage reduction much, a subblock matching threshold of T subblocks can be applied. If a matching run (present subblocks) is encountered, but it is of length T−1 or less subblocks, then the (present) subblocks are duplicated in the store so as to reduce fragmentation. FIG. 10 shows how, by storing subblock C twice, fragmentation is eliminated, and BLOB2 100 is represented by subblocks within a single cluster 102. It is important to note that the motivation for this technique is independent of any bitfilter false positives. This approach may cause some subblocks to be stored multiple times, but the additional space used is disk space only, and the technique may reduce fragmentation and thereby decrease BLOB retrieval time.

If, for defragmentation reasons, a value of threshold T of greater than one subblock (which represents a normal system) is used, then this scenario can also be used to reduce the cost of false positives. If, for example, T is 2, then if, following a non-matching subblock, a subblock is encountered that hashes to a '1' bit in the bitfilter, then there is no need to lookup the index unless the next subblock also hashes to a '1' bit in the bitfilter. In general, use of a threshold reduces the (per subblock) probability of false positives from 1/D to (1/D) T. For D=100, this reduces the frequency of false positives from 1 in 100 to 1 in 10,000—a very significant decrease.

Figure 16:
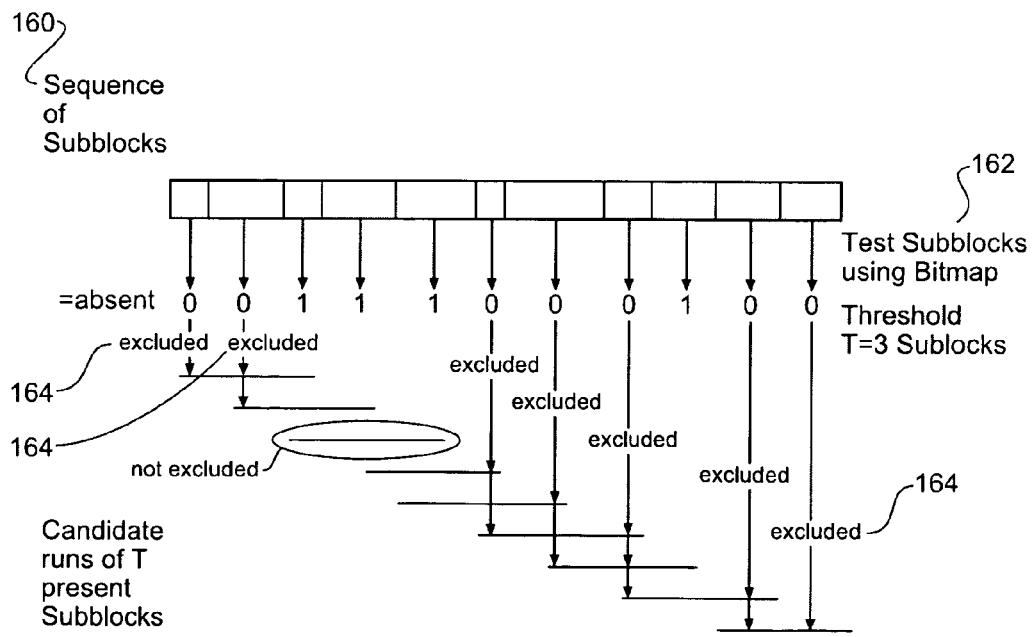
FIG. 16 shows the process of determining within a sequence of subblocks, the non-existence of contiguous runs of T present subblocks for a sequence of subblocks.

Because a subblock that maps to a '0' in the bitfilter is guaranteed not to be present in the store, the bitfilter can be used to exclude all but some runs of T subblocks as candidate runs of T present subblocks. FIG. 16 depicts a sequence of subblocks 160 that are in the process of being stored under a regime in which only contiguous runs of three (T=3) or more present subblocks are treated specially (i.e. stored as references to already present subblocks). Each subblock is looked up in the bitfilter 162. Any subblock which maps to a '0' cannot be part of a run of T present subblocks. Thus, the bitfilter assists in the search of contiguous runs of T or more present subblocks by excluding 164 all but a few candidate runs which can be tested more thoroughly by accessing the index.

IX. Setting Multiple Bits For Each Subblock

Figure 20:
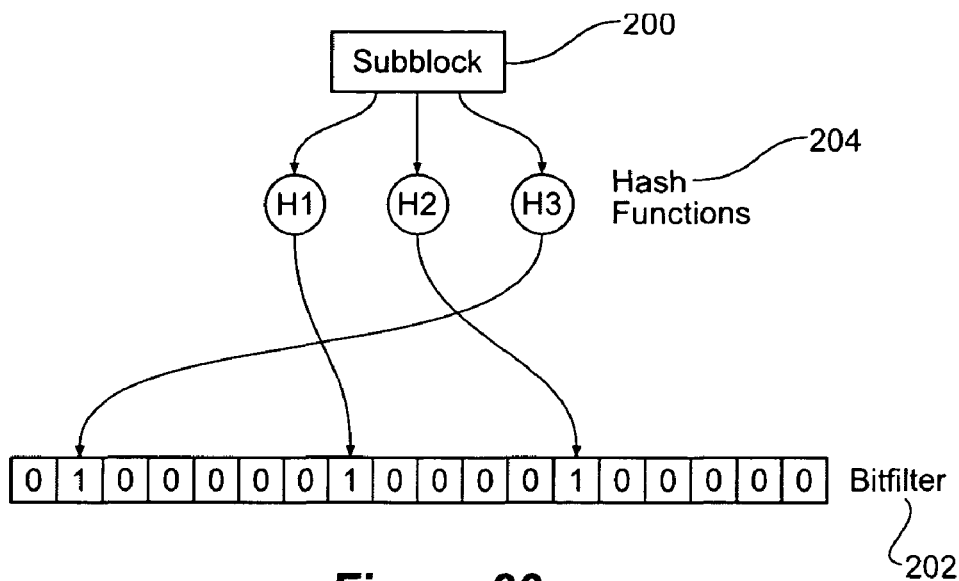
FIG. 20 shows how a plurality of N different functions that map a subblock to a position in the bit filter can be used to set N bits in the bit filter for each subblock.

Another method for reducing the false positive rate is to map each subblock 200 to N positions (where N is a small positive integer) in the bitfilter 202, and set the bits at all N positions. This can be achieved by employing N different hash functions 204. FIG. 20 shows how a single subblock 200 can by hashed by three different hash functions (H1, H2 and H3) into three positions in the bit filter and cause three bits to be set.

Figure 21:
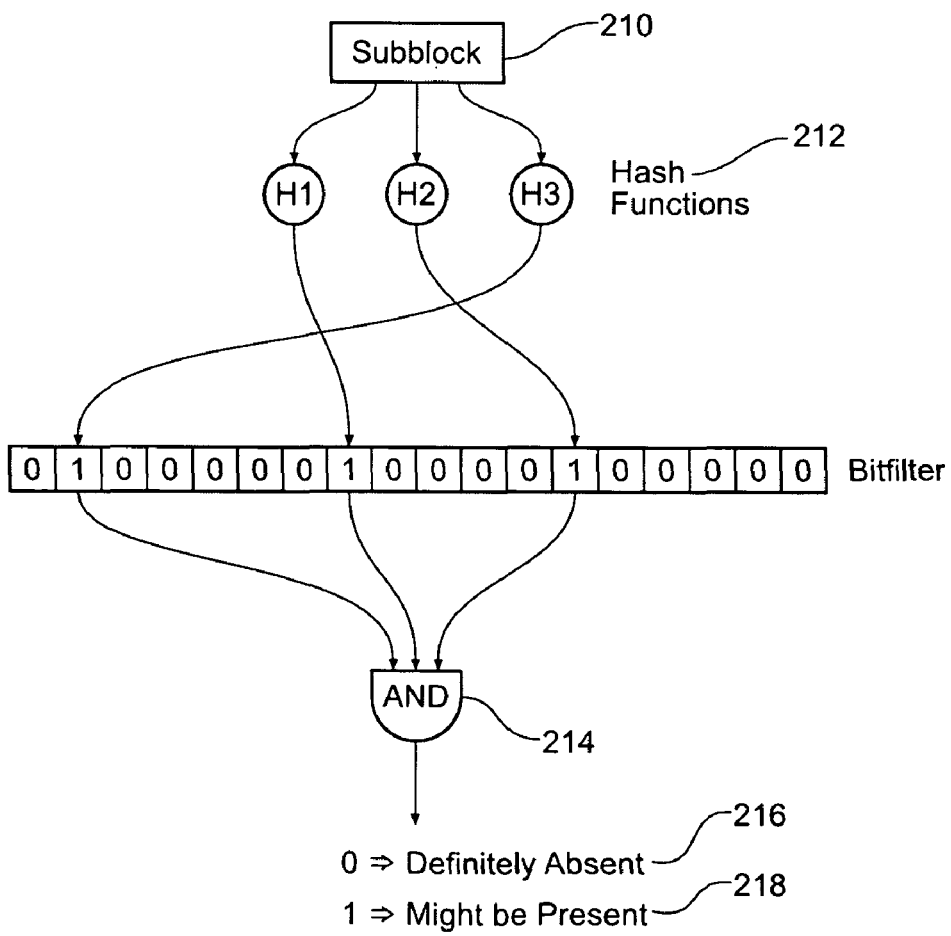
FIG. 21 shows how a subblock is tested by a bit filter where each subblock has set N bits (as in FIG. 20). The subblock is hashed by each of the N functions and the results used to index the bit filter. The resultant bits are ANDed to yield the lookup result.

To test a subblock 210, the subblock is hashed by the N different hash functions 212 and the corresponding bits in the bit filter looked up. The results are ANDed 214 together to yield a single result bit that is '0' if the subblock is definitely absent 216 and '1' if it might be present 218 (FIG. 21).

Setting N bits for each subblock increases the density of the bitfilter by about a factor of N (for a sparse bitmap). If a million-bit filter with N=1 had 1000 bits set and a density of 0.001, under a regime with N=3, its density would triple to approximately 0.003. However, the probability of a false positive would plummet from 0.001 to 0.0033 which is about $2.7 \times 10^{-8}$. This example shows how increasing N has a linear effect on bit density but an exponential effect on the false positive rate.

X. Bitfilter Compression

In order to yield a low false positive rate, the bitfilter must be sparse, and if it is sparse, it has low entropy and is highly compressible. Furthermore, because of the chaotic way in which bits are set in the bitfilter, the bitfilter will approximate the output of a memoryless binary random number generator with a probability of 1/D of a '1' and (D−1)/D of a '0' (where D is the bitfilter density). This means that compression can be performed without having to build complex models of the data. Most importantly, so long as the density of the bitfilter is known, individual pieces of it can be compressed independently with no loss of compression (relative to compressing larger pieces of the data).

The field of compression provides a wide variety of techniques for compressing memoryless binary sources. The next few sections explore some of these.

XI. Run-Length Encoding Bitfilter Compression

One simple technique for compressing bitfilters is run-length encoding in which the bitfilter is represented as a sequence of numbers being the lengths of the '0'-bit runs (for sources where '0's are more likely than '1's). The various run-length encoding methods differ mainly in the way in which they represent the run lengths.

One simple form of run-length encoding is to use fixed-width lengths. For example, if we choose a width of one byte (8-bit lengths), then a run of 47 '0' bits followed by a '1' bit would be represented by the byte value (decimal) 47. To allow runs of '0' bits longer than 255, the value 255 can be reserved as a special code that means that the four bytes that follow it are the actual length. This enables the code to represent runs of up to $2^{32}-1$ '0' bits. If it is necessary to be able to represent even longer runs, then a special code (e.g. FFFFFFFF) could be defined within the four-byte value to indicate that the real length follows in the following eight bytes. A bit block that ends in a '0' can be represented either by adopting the convention of always, truncating the final '1' bit, or by storing a length.

The advantage of choosing bytes as lengths is that they are very easy to load from memory.

XII. Tanaka and Leon-Garcia Bitfilter Compression

A particular form of run-length coding by Tanaka and Leon-Garcia provides highly efficient compression while retaining the simplicity of run-length coding.

A Tanaka/Leon-Garcia mode-m code maps a run of k '0' bits followed by a '1' bit (for k=0.2^m−1) by the bit string "1<k in binary as m bits>" and a run of $2^m$ '0' bits to the bit string "0". Thus a mode 3 code maps bits as follows:

| Input | Output |
|---|---|
| 00000000 | 0 |
| 1 | 1000 |
| 01 | 1001 |
| 001 | 1010 |
| 0001 | 1011 |
| 00001 | 1100 |
| 000001 | 1101 |
| 0000001 | 1110 |
| 00000001 | 1111 |

Tanaka and Leon-Garcia showed that for any binary memoryless source (as chosen by the single parameter p—the probability of a '1' bit), there exists a mode-m code that will compress that source with at least 96% efficiency relative to its theoretical compressibility. The formula for m is:

```
gamma = (squareroot(5)−1)/2
if (count(one_bits) = 0)
    p = 1/count(total_bits)
else
    p = count(one_bits)/count(total_bits)
endif
m = ceiling(log2((In gamma)/In(1−p)))
```

So to compress a block of bits using this method, the '1' bits and the total number of bits are counted and the optimal m calculated and the block coded using the mode m code. The mode of the code m can be stored at the start of the coded block. More details are provided in Hatsukazu Tanaka and Alberto Leon-Garcia, "Efficient Run-Length Encodings", IEEE Transactions on Information Theory, 28(6), November 1982, pp. 880-890

XIII. Arithmetic Coding of Bitfilters

Arithmetic coding provides the most space-efficient method to compress a bitfilter, but at some implementation complexity and possibly a reduction in speed relative to run-length coding. A binary arithmetic code is described by Langdon and Rissanen in the referenced paper Langdon G. G and Rissanen J. J, "Compression of Black-White Images with Arithmetic Coding", IEEE Transactions on Communications, 29(6), 1981, pp. 858-867.

XIV. Non-Linear Compressibility of Bitfilters

An interesting aspect of bitfilter compression is that doubling the size of the bitfilter (for a given number of '1' bits) will not result in the size of the compressed bitfilter doubling. Instead it will increase in size by a lesser amount. This is because the density of the doubled bitfilter is half that of the original and the decrease in entropy makes the larger bitfilter more compressible.

FIG. 11 shows a plot of the relationship between bitfilter density and compressibility for a bitfilter containing one thousand '1' bits. The X axis is the total number of bits in the bitfilter (uncompressed) and, as this is increased, the entropy of the bitfilter (the lower theoretical bound on its compressed size) increases, but not linearly. At a total size of 2000 bits, where 50% of the bits are '1's and 50% '0's, the entropy is 2000 bits, but at a total size of 10,000 bits, the entropy is 4834 bits—less than half of what might be expected (10,000 bits) if there were linear growth in entropy with bitfilter size for a fixed number of bits.

This non-linearity can be analysed probabilistically. If the probability of a '1' bit is p (and hence the probability of a '0' bit is 1−p) then in theory, each '0' bit can be compressed to $$-\log_2(1-p) \text{ bits}$$

and each '1' bit can be compressed to:

$$-\log_2(p) \text{ bits}$$

This means that, on average, each bit in the bitfilter can be compressed to $$-(1-p)\log_2(1-p)-p\log_2(p) \text{ bits}$$

and this formula determines the shape of the graph of FIG. 11.

The non-linear compressibility of bitfilters means that the trade-off between the false positive rate (which is directly related to the bitfilter density) and memory consumption is non-linear, and some thought should be put into the trade-off in any particular embodiment. In particular, it is tempting to increase the (uncompressed) size of the bitfilter because it will reduce the false positive rate linearly, but will increase the space consumed by the bitfilter sub-linearly.

XV. Bitfilter Division

As each new subblock arrives, it is looked up in the bitfilter (by hashing it to a bitfilter position) to determine if the bit is '0' or '1'. If the entire bitfilter is compressed, then the entire bitfilter would have to be decompressed before each lookup (or at least the part of it before the bit being accessed would have to be decompressed), an operation that would be time consuming and whose output (the decompressed bitfilter) could be hundreds of times larger than the compressed bitfilter.

To avoid having to decompress bits that are not immediately required, the bitfilter can be divided into sections and each section compressed separately. To lookup an individual bit, only the section containing the bit needs to be decompressed (or the portion of the section before the bit to be tested). If the index is divided into sections, with a separate bitfilter for each section, the bitfilters may be small enough not to require further subdivision. Alternatively, it may be advantageous to subdivide the bitfilter further, solely to reduce the amount of bitfilter that must be decompressed to access any single bit.

If the bitfilter is compressed, any technique that sets N bits per subblock will have to decompress about N sections (and, if setting bits, compress them again too). This decompression will impose a processing cost that might motivate system designers to keep N low.

XVI. Processing an Absent Subblock

Figure 17:
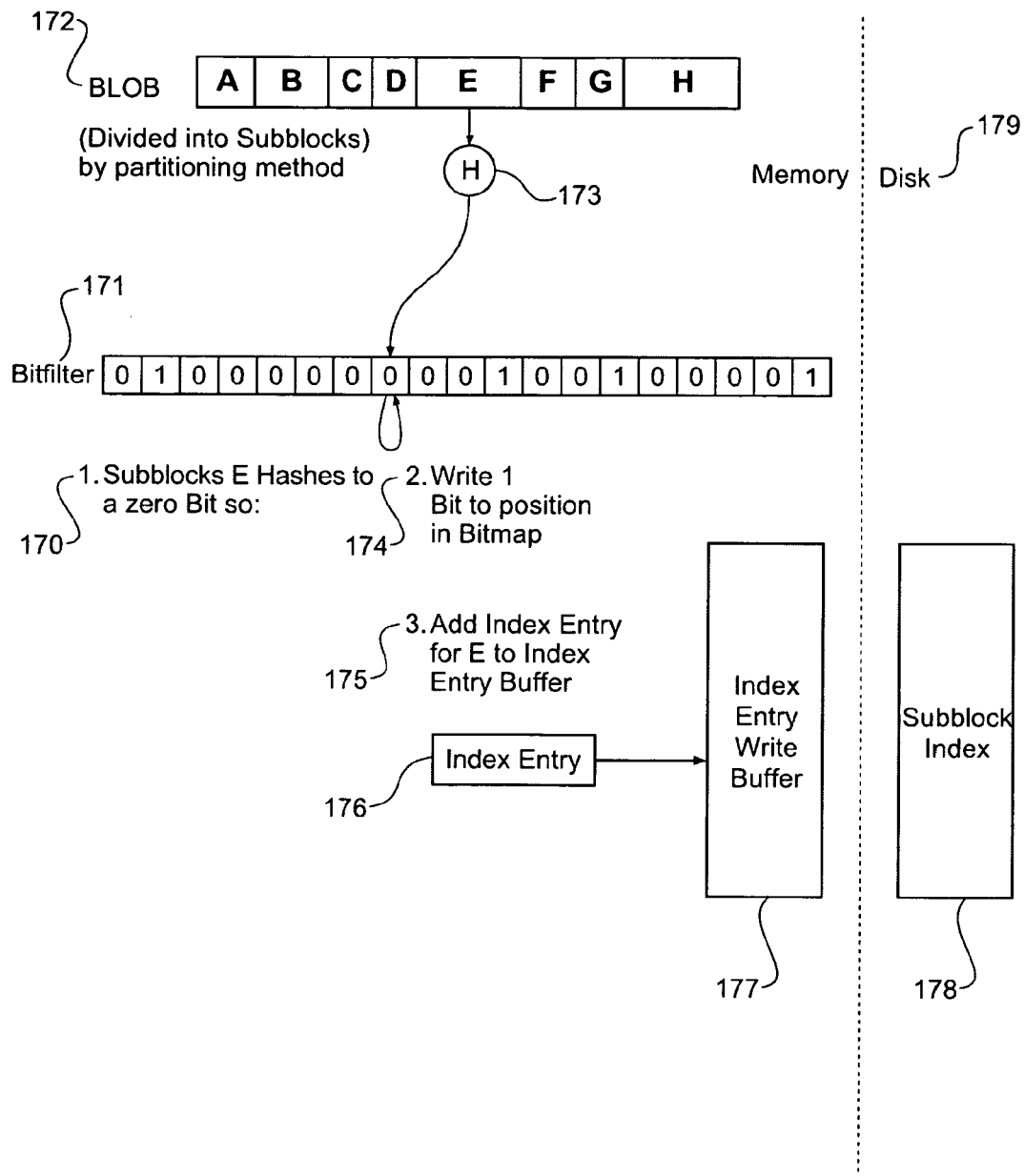
FIG. 17 shows the division of a BLOB into subblocks by a partitioning method, the hashing of subblock E to a bit in a bitfilter, the testing of that bit, the setting of the bit to '1' if and only if the bit value is '0', and the adding of an entry for E to an index entry buffer.
Figure 18:
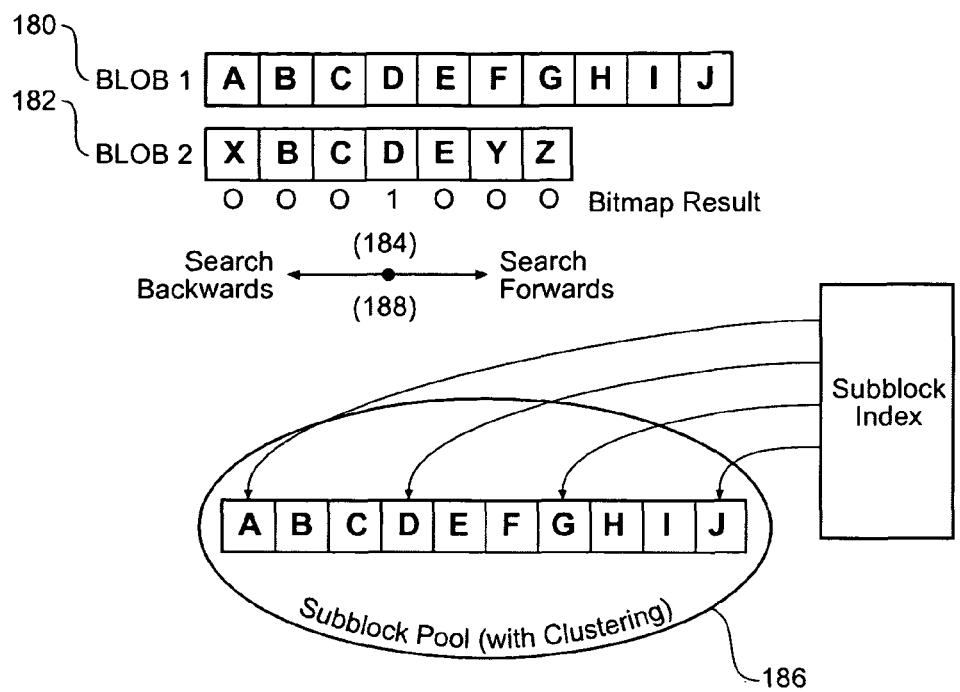
FIG. 18 shows an aspect in which BLOB1 has been stored, but only every third subblock has been indexed. When BLOB2 is added, each of its subblocks is looked up in the index and when a match is found, the search for matching blocklets proceeds backwards as well as forwards.

FIG. 17 shows how a single absent subblock 170 (which will often occur within a run of absent subblocks) is processed in relation to the bitfilter 171 and the index entry write buffer. The diagram follows the processing of a subblock E that is in the process of being stored as part of the storage of an enclosing BLOB 172. First, subblock E is hashed 173 to yield a position in the bitfilter and consequently a binary digit, being that position's contents. If E is absent from the store (and this section focuses on that case), the bit will be '0'. Because the subblock is about to be stored, the bit in the bitfilter is set to '1' to record subblock E's presence. The subblock is then stored 174 somewhere in the storage system and an index entry prepared 175 that maps the subblock to its storage location. This index entry 176 is added to the index entry write buffer 177 from which it will later be written to the subblock index 178 on disk 179. An aspect of this entire process is that (assuming that the contents of subblock E itself are also buffered in memory), the entire process does not require a single disk access.

XVII. Representations of Remote Storage Systems

Figure 19:
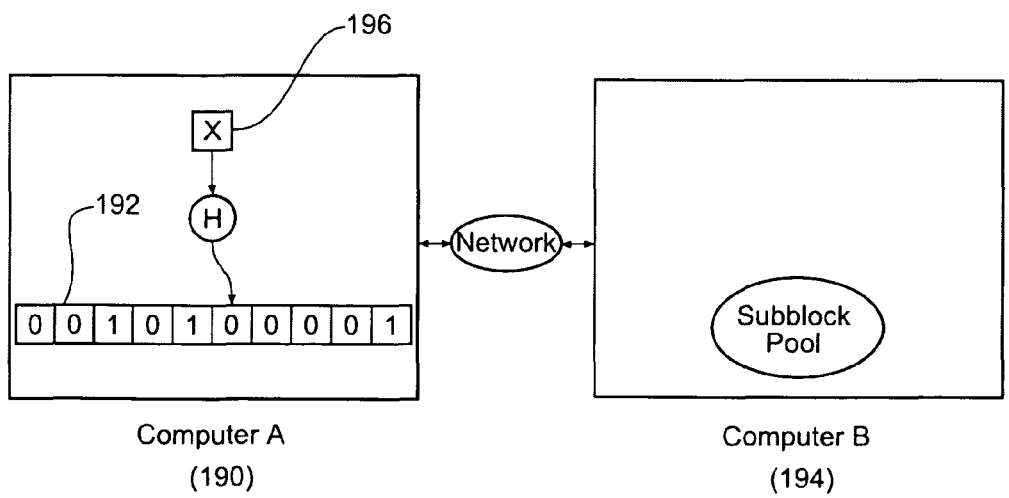
FIG. 19 shows how a computer A could maintain a bitfilter that corresponds to the collection of subblocks stored on a separate computer B. In this example, computer A can use its bitfilter to determine that computer B does not possess subblock X.

In distributed storage applications and communications applications, an aspect of the invention could be used to represent the existence of a set of subblocks on a remote computer so as to, for example, determine the need to transmit subblocks to the remote computer. In general, an aspect of the invention could be used to represent sets of subblocks on one or more computers anywhere else in the world, not just on the computer storing the bitfilter. FIG. 19 shows how a computer A 190 could maintain a bitfilter 192 that corresponds to the collection of subblocks stored on a separate computer B 194. In this example, computer A can use its bitfilter to determine that computer B does not possess subblock X 196.

A single bitfilter on one computer could represent the union of the sets of subblocks on multiple other computers.

XVIII. Robustness

Figure 12:
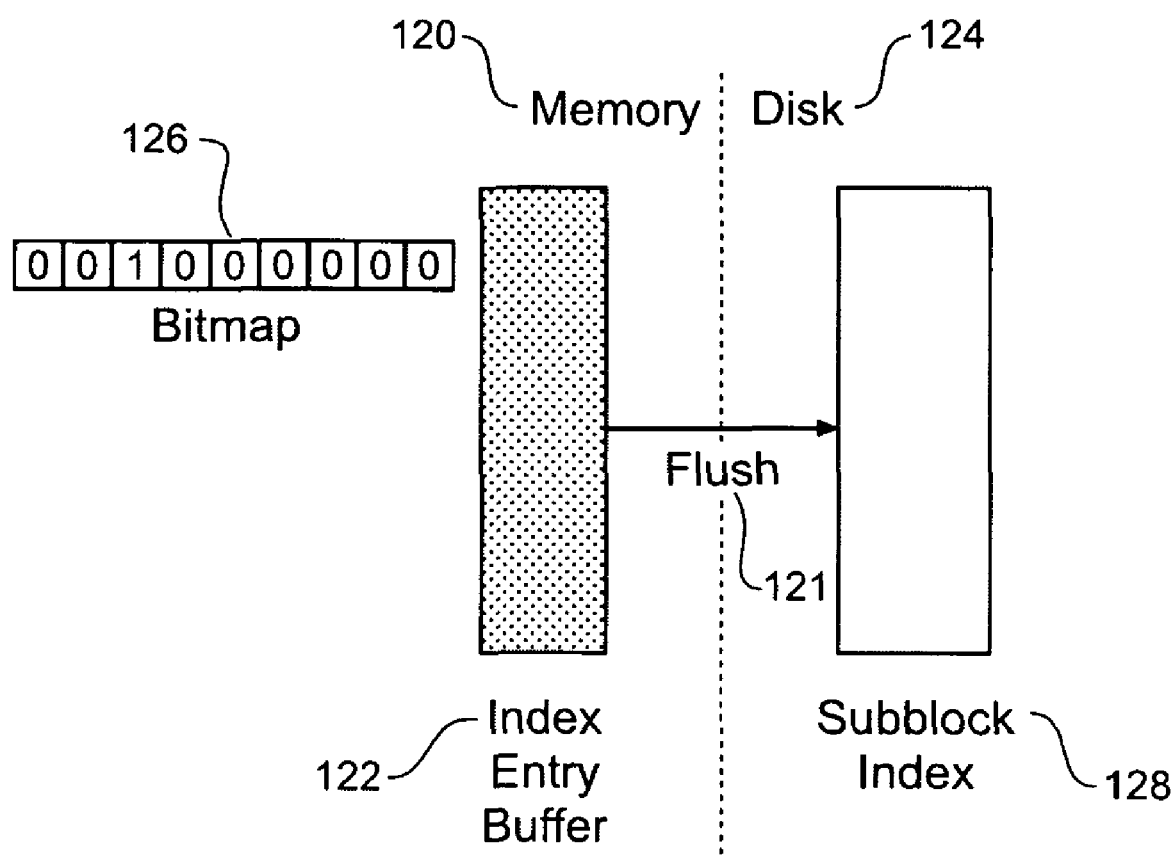
FIG. 12 shows the use of an index entry write buffer where a bitfilter and the buffer are held in memory, but the subblock index itself resides disk.
Figure 13:
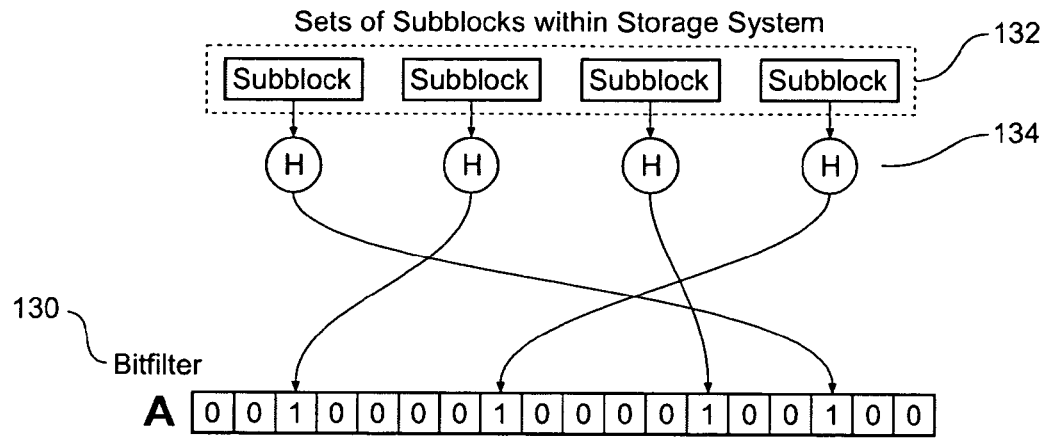
FIG. 13 shows a bitfilter as derived from a set of subblocks in a storage system.
Figure 14:
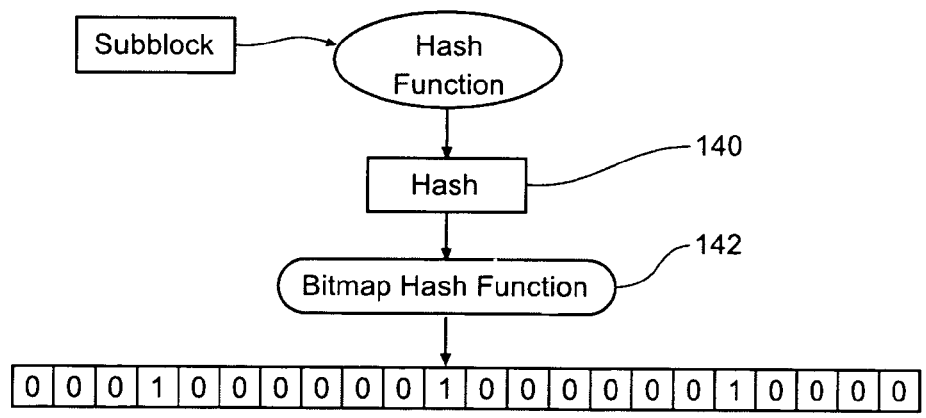
FIG. 14 shows how a subblock is mapped to a position in the bitfilter, first by taking its hash and then feeding that into the bitfilter hash function to generate the bitfilter index.

In a typical embodiment of the invention, the index resides on disk and the bitfilter and index entry write buffer reside in memory (FIG. 12). It would be typical practice to maintain a copy of the bitfilter on disk, which is updated from time to time. How does this organisation fare in the face of a system crash?

If the computer crashes and the contents of memory are lost, the setting of various bits in the bitfilter will be lost (because the older copy of the bitfilter on disk will have '0's in some of those positions rather than '1's). The index entries in the index entry write buffer will also be lost.

Each of these losses could impact on the redundancy reduction performance, but do not threaten correctness. The effect of losing the setting of some bits in the bitfilter or of losing index entries is that, while the subblock still safely exists in the store (and may still form part of one or more BLOBs), the store's index no longer remembers the subblock. Consequently, if the same subblock arrives again, it will be stored a second time. This does not affect correctness because the earlier subblock still exists in the subblock pool and is still accessible as part of one or more BLOBs which point to the subblock independently of the index.

Thus, the effect of changing a bitfilter bit from a '1' to a '0' is that one or more subblocks may be duplicated in the store if they appear as part of a new BLOB being stored. The effect of changing a bitfilter bit from a '0' to a '1' would be to cause the index to be accessed whenever a new subblock happens to hash to that bit in the bitfilter.

Thus, consequent loss of '1' bits in the bitfilter does not threaten correctness and so long as crashes are relatively rare, the loss of some '1' bits in the bitfilter or index entries in the buffer will not affect reduction performance much.

If reduction performance is absolutely critical, or there is some absolute requirement that the subblock pool never store the same subblock twice, then the embodiment could employ some non-volatile RAM whose contents will survive a system crash.

Figure 22:
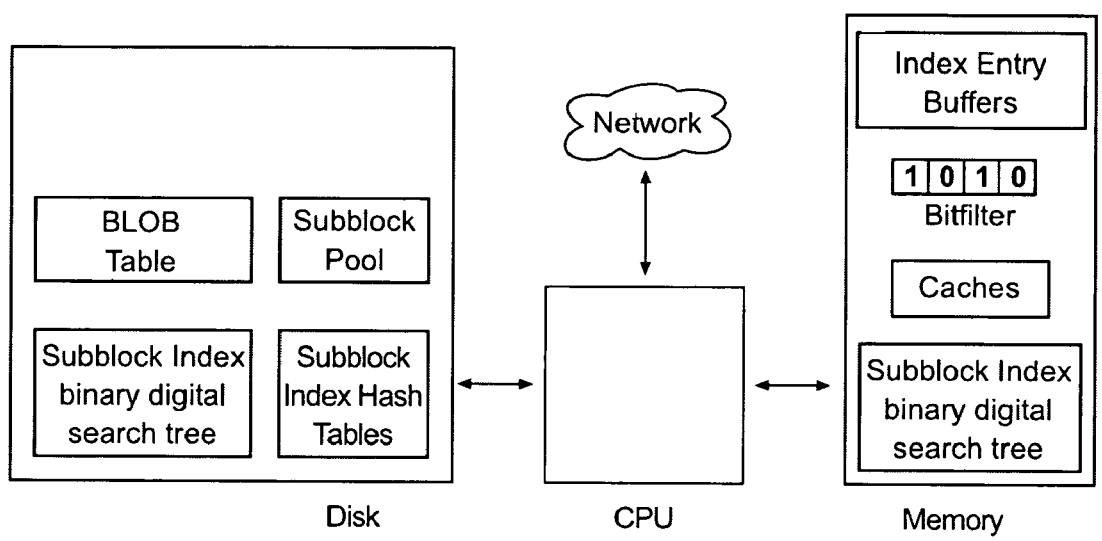
FIG. 22 shows how an embodiment might be deployed on typical computer hardware. The subblock index digital search tree resides in memory and disk, but the subblock index hash tables reside only on disk. The bitfilter resides in memory while the index entry buffers cache entries to be written to the hash tables on disk.

FIG. 22 shows how an embodiment might be deployed on typical computer hardware. The subblock index digital search tree resides in memory and disk, but the subblock index hash tables reside only on disk. The bitfilter resides in memory while the index entry buffers cache entries to be written to the hash tables on disk.

XIX. A Note on Scope

It will be appreciated by those skilled in the art that the invention is not restricted in its use to the particular application described. Neither is the present invention restricted in its preferred embodiment with regard to the particular elements and/or features described or depicted herein. It will be appreciated that various modifications can be made without departing from the principles of the invention. Therefore, the invention should be understood to include all such modifications within its scope.

What is claimed is:

1. A method for representing the presence of a subblock in a storage system, comprising:
   hashing a subblock to obtain an index hash value for the subblock;
   creating an array of bits using a function that inputs the index hash value for the subblock and outputs bits into the array of bits and maps the subblock to a position in the array of bits, where a bit in the array of bits is a predetermined bit value that indicates whether at least one subblock in the storage system maps to the bit position in the array of bits;
   selectively storing the index hash value in a subblock index located on the storage system if the subblock is absent from the storage system;
   selectively storing the index hash value in a subblock index entry write buffer located in memory if the subblock is absent from the storage system, where the index entry write buffer is divided into a plurality of buffer portions corresponding to a portion of the subblock index located on the storage system; and
   transferring the contents of the index entry write buffer to the subblock index located on the storage system using a single sequential read and write operation of the storage system.

2. The method of claim 1, where the function is a hash function.

3. The method of claim 1, where the function is calculated using a cryptographic hash function whose result is input into a second calculation.

4. The method of claim 3, where the second calculation is a modulo K operation, where K is the number of bits in the array of bits.

5. The method of claim 1, where the function is calculated using a non-cryptographic hash function whose result is input into a second calculation.

6. The method of claim 5, where the second calculation is a modulo K operation, where K is the number of bits in the array of bits.

7. The method of claim 1, where a plurality of functions map a subblock to a position in the array of bits, and where a bit in the array of bits is said predetermined bit value when at least one subblock function combination maps to the bit position in the array of bits.

8. The method of claim 7, where the array of bits is divided into one or more sections.

9. The method of claim 8, where a section is compressed by a compression method.

10. A method for determining whether a subblock z is absent in a storage system by applying functions of claim 7 to the subblock z and testing the value of the corresponding bits of a array of bits created in accordance with the method of claim 7, where the subblock is absent if tested bits of the array of bits are a further predetermined bit value.

11. The method of claim 1, where the index entry write buffer is partitioned into a plurality of sections, and where data of a section is transferred to the subblock index on the storage system when a data capacity of the section is full.

12. The method of claim 1, where when the index entry write buffer becomes full to a predetermined level, the index is read into memory, and the elements in the index entry write buffer are added to the index and the modified index is then written to disk.

13. The method of claim 1, where a set of subblocks is partitioned into a plurality of mutually exclusive spaces and a second array of bits represents the presence of a subblock in the storage system.

14. The method of claim 13, where the partitioning of the subblock space is performed by hashing subblocks and splitting the space of subblock hashes using a binary digital search tree.

15. The method of claim 13, where the index entry write buffer is correspondingly divided.

16. The method of claim 1, where the array of bits is stored in memory.

17. A method for determining whether a subblock z is absent in a storage system by applying the function of claim 1, to the subblock z and testing the value of the corresponding bit of the array of bits, the array of bits having been created in accordance with the method of claim 1.

18. A method for determining, within a sequence of subblocks, the nonexistence of contiguous runs of at least T present subblocks at various positions in the sequence, by using the method of claim 17 to test subblocks in the sequence for its definite absence.

\* \* \* \* \*